US012359645B2

(12) United States Patent
Watai et al.

(10) Patent No.: US 12,359,645 B2
(45) Date of Patent: Jul. 15, 2025

(54) FUEL INJECTION DEVICE

(71) Applicant: Hitachi Astemo, Ltd., Hitachinaka (JP)

(72) Inventors: Takuya Watai, Hitachinaka (JP); Takao Miyake, Hitachinaka (JP); Taisuke Sugii, Tokyo (JP); Masashi Sugaya, Hitachinaka (JP)

(73) Assignee: Hitachi Astemo, Ltd., Hitachinaka (JP)

(*) Notice: Subject to any disclaimer, the term of this patent is extended or adjusted under 35 U.S.C. 154(b) by 278 days.

(21) Appl. No.: 18/007,592

(22) PCT Filed: May 13, 2021

(86) PCT No.: PCT/JP2021/018150
§ 371 (c)(1),
(2) Date: Dec. 1, 2022

(87) PCT Pub. No.: WO2022/024497
PCT Pub. Date: Feb. 3, 2022

(65) Prior Publication Data

US 2023/0193868 A1 Jun. 22, 2023

(30) Foreign Application Priority Data

Jul. 28, 2020 (JP) ................................ 2020-127003

(51) Int. Cl.
*F02M 61/18* (2006.01)

(52) U.S. Cl.
CPC ........ *F02M 61/188* (2013.01); *F02M 61/182* (2013.01)

(58) Field of Classification Search
CPC .. F02M 61/18; F02M 61/1813; F02M 61/182; F02M 61/1832; F02M 61/1833;
(Continued)

(56) References Cited

U.S. PATENT DOCUMENTS 6,427,932 B1 * 8/2002 Danckert ............... F02M 61/18 239/533.12
6,698,674 B2 * 3/2004 Dantes ................. F02M 45/086 239/585.5
(Continued)

FOREIGN PATENT DOCUMENTS

JP 2-59260 U 4/1990
JP 10-227218 A 8/1998
(Continued)

OTHER PUBLICATIONS

International Search Report (PCT/ISA/210) issued in PCT Application No. PCT/JP2021/018150 dated Jul. 27, 2021 with English translation (four (4) pages).
(Continued)

*Primary Examiner* — Logan M Kraft
*Assistant Examiner* — Johnny H Hoang
(74) *Attorney, Agent, or Firm* — Crowell & Moring LLP

(57) ABSTRACT

A fuel injection device includes a nozzle element, an injection hole forming member, and a valve element. The injection hole forming member includes a seat part having the seat surface, and a suck chamber formed on a front end part of the seat part, the suck chamber being a recess denting in the direction of heading from the seat surface toward a front end part. The suck chamber has a suck chamber injection hole from which a fuel is jetted toward the ignition plug.

7 Claims, 5 Drawing Sheets

(58) Field of Classification Search
CPC ... F02M 61/1836; F02M 61/188; F02M 61/04
USPC ...................................... 123/470; 239/533.12
See application file for complete search history.

(56) References Cited

U.S. PATENT DOCUMENTS

| | | | | |
|---|---|---|---|---|
| 7,140,556 | B2 * | 11/2006 | Cristiani | F02M 61/1826 239/533.13 |
| 7,404,526 | B2 * | 7/2008 | Cooke | F02M 61/042 239/444 |
| 8,151,762 | B2 * | 4/2012 | Nishimoto | F02B 23/104 123/406.47 |
| 8,919,677 | B2 * | 12/2014 | Soteriou | F02M 61/1866 239/584 |
| 10,302,054 | B2 * | 5/2019 | Kaneta | F02M 61/1866 |
| 10,989,105 | B2 | 4/2021 | Kusakabe et al. | |
| 10,995,655 | B2 | 5/2021 | Iizuka et al. | |
| 2002/0125345 | A1 * | 9/2002 | Harata | F02M 61/1806 239/596 |
| 2008/0128535 | A1 * | 6/2008 | Aota | F02M 61/1853 239/533.12 |
| 2008/0196691 | A1 * | 8/2008 | Kihara | F02M 61/1806 123/299 |
| 2010/0237174 | A1 * | 9/2010 | Oomori | F02M 51/0675 239/533.12 |
| 2016/0341165 | A1 * | 11/2016 | Ishikawa | F02M 61/1833 |
| 2018/0149127 | A1 * | 5/2018 | Hosaka | F02M 61/162 |
| 2019/0040790 | A1 | 2/2019 | Kusakabe et al. | |
| 2019/0257264 | A1 | 8/2019 | Iizuka et al. | |
| 2021/0190025 | A1 * | 6/2021 | Hosaka | F02M 61/1846 |

FOREIGN PATENT DOCUMENTS

| | | | |
|---|---|---|---|
| JP | 2010-43541 | A | 2/2010 |
| JP | 2016-98702 | A | 5/2016 |
| JP | 2017-44174 | A | 3/2017 |
| JP | 2019-116900 | A | 7/2019 |
| WO | WO 2018/101118 | A1 | 6/2018 |

OTHER PUBLICATIONS

Japanese-language Written Opinion (PCT/ISA/237) issued in PCT Application No. PCT/JP2021/018150 dated Jul. 27, 2021 (four (4) pages).

Japanese-language Office Action issued in Japanese Application No. 2022-540025 dated Aug. 8, 2023 with English translation (8 pages).

* cited by examiner

FUEL INJECTION DEVICE

TECHNICAL FIELD

The present invention relates to a fuel injection device.

BACKGROUND ART

Conventionally, an internal combustion engine of a cylinder injection type in which a fuel injection device injects a fuel directly into a cylinder has been used as one of internal combustion engines. One of conventional techniques related to a fuel injection device is, for example, a technique described in PTL 1.

PTL 1 describes a technique related to a fuel injection device that includes a valve element and an injection hole forming portion on a front end side of the valve element, the injection hole forming portion having a plurality of injection holes for injecting a fuel. PTL 1 states that the injection hole forming portion has a first injection hole in which an intersection angle between a central axis of the injection hole forming portion and an axis of the first injection hole is θ1, and a second injection hole in which an intersection angle between the central axis of the injection hole forming portion and an axis of the second injection hole is θ2 larger than θ1.

CITATION LIST

Patent Literature

PTL 1: WO 2018/101118 A

SUMMARY OF INVENTION

Technical Problem

A fuel tends to deposit on a front end part of a fuel injection device during or after a fuel injection process. According to the technique described in PTL 1, however, a problem of the fuel depositing on the front end part is not taken into consideration. As a result, applying the technique described in PTL 1 involves a problem that the fuel deposited on the front end part turns into soot to create a condition where luminous flame readily develop, thus impairing exhaust gas performance.

An object of the present invention, which has been conceived in view of the above problem, is to provide a fuel injection device that can suppress deposition of a fuel on the surface of a front end part to improve combustion stability.

Solution to Problem

In order to solve the above problem and achieve the object, a fuel injection device includes a nozzle element, an injection hole forming member, and a valve element. The nozzle element is set on a cylinder of an internal combustion engine, the cylinder having an ignition plug disposed thereon. The injection hole forming member is disposed on a front end part of the nozzle element. The valve element has a valve element side seat surface that comes into contact with and separates from a seat surface formed on the injection hole forming member.

The injection hole forming member includes a seat part having the seat surface, and a suck chamber formed on a front end part of the seat part, the suck chamber being a recess denting in the direction of heading from the seat surface toward a front end part. The suck chamber has a suck chamber injection hole from which a fuel is jetted toward the ignition plug.

Advantageous Effects of Invention

The fuel injection device having the above configuration can suppress deposition of the fuel on the surface of the front end part to improve combustion stability.

DESCRIPTION OF EMBODIMENTS

An embodiment of a fuel injection device will hereinafter be described with reference to FIGS. 1 to 7. In individual drawings, the same members will be denoted by the same reference signs.

1. Embodiment

1-1. Configuration of Fuel Injection Device

A configuration of a fuel injection device according to an embodiment (which will hereinafter be referred to as “this embodiment”) will first be described with reference to FIG. 1.

Figure 1:
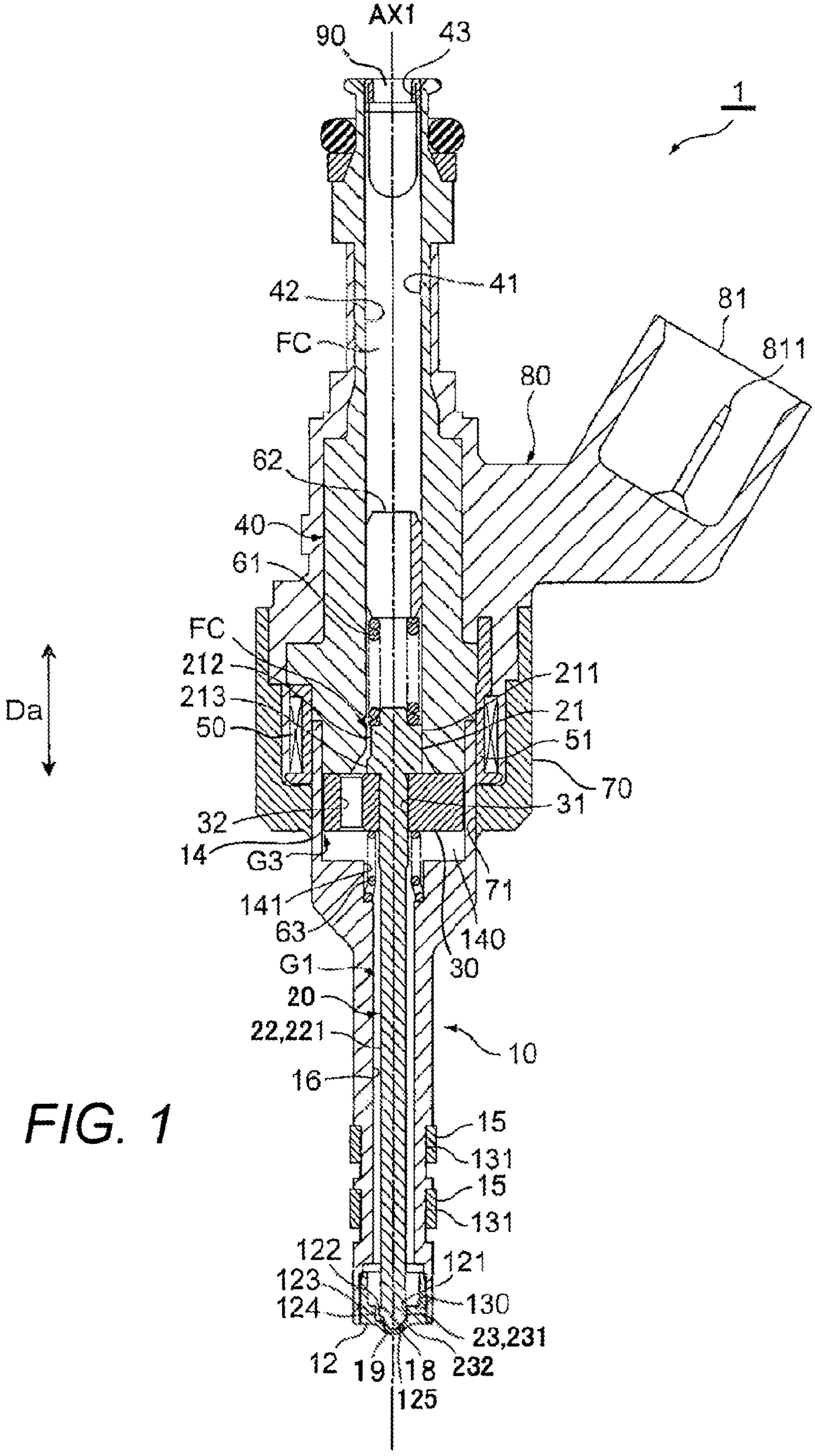
FIG. 1 is a sectional view of a fuel injection device according to an embodiment.

FIG. 1 is an exploded perspective view of the fuel injection device.

The fuel injection device shown in FIG. 1 is used for a four-cycle engine that, as an internal combustion engine, repeats these four cycles: an injection cycle, a compression cycle, a combustion (expansion) cycle, and an exhaust cycle. The fuel injection device is applied to an internal combustion engine of a cylinder injection type that injects a fuel into each cylinder.

As shown in FIG. 1, a fuel injection device 1 includes a nozzle element 10, a valve element 20, a movable core 30, a fixed core 40, a coil 50, a housing 70, a connecting portion 80, and a filter 90. The fuel injection device 1 includes also a first spring 61, a second spring 63, and an adjustment member 62.

[Nozzle Element]

The nozzle element 10 is formed into a cylindrical shape. A first internal space 130 is formed on a front end part of the nozzle element 10, the front end being one end part in an axial direction Da along an axis AX1 (which will hereinafter be simply referred to as “axial direction Da”). A large-diameter part 14 larger in outer diameter than the front end part is formed on a rear end part that is the other end part in the axial direction Da of the nozzle element 10. A second internal space 140 is formed on the large-diameter part 14. The first internal space 130 and the second internal space 140 communicate with each other through a communication hole 16 formed along the axial direction Da of the nozzle element 10.

The first internal space 130 is a recess denting in the direction of heading from the front end part of the nozzle element 10 toward the interior of the nozzle element 10 in the axial direction Da. An injection hole forming member 12 is inserted or press-fitted in the first internal space 130. The injection hole forming member 12 is fixed to the nozzle element 10 by welding the injection hole forming member 12 to the nozzle element 10 along the entire inner peripheral edge of an opening of the front end part of the nozzle element 10. The injection hole forming member 12 has a plurality of injection holes 18 and 19 for injecting a fuel. Detailed configurations of the injection hole forming member 12 and the injection holes 18 and 19 will be described later.

A plurality of grooves 131 (two grooves in this embodiment) are formed on an outer peripheral surface of the nozzle element 10 on a front end part side. The grooves 131 are formed continuously along the circumferential direction of the outer peripheral surface of the nozzle element 10. A sealing member 15 is fitted into each groove 131. The sealing member 15 seals a gap between a cylinder 301 (see FIG. 2) and the fuel injection device 1 when the fuel injection device 1 is attached to the cylinder 301 of the internal combustion engine.

The second internal space 140 is a recess with a bottom, the recess denting in the direction of heading from on an opening on a rear end side of the large-diameter part 14 toward a front end in the axial direction Da. In the second internal space 140, the movable core 30 and a part of the fixed core 40 are placed. The movable core 30 and fixed core 40 will be described later. At the center of the bottom of the second internal space 140, a spring housing part 141 formed in such a way as to be concentric with the second internal space 140. The spring housing part 141 is a recess denting in a cylindrical shape in the direction of heading from the bottom of the second internal space 140 toward the front end part. In this spring housing part 141, one end of the second spring 63 is housed.

[Valve Element]

Inside the nozzle element 10, the valve element 20 is disposed in such a way as to be movable along the axial direction Da. The valve element 20 is formed into a columnar shape. The valve element 20 includes a rear end part 21, a front end part 23, and an intermediate part 22 that is a part between the rear end part 21 and the front end part 23. The front end part 23 is formed on a front end side in the axial direction Da of the valve element 20, and the rear end part 21 is formed on a rear end side in the axial direction Da of the valve element 20.

The front end part 23 is fitted in the injection hole forming member 12 disposed on the front end part of the nozzle element 10. As a result of the valve element 20 moving along the axial direction Da, the front end part 23 opens and closes the injection holes 18 and 19 formed on the injection hole forming member 12. A detailed configuration of the front end part 23 will be described later.

The intermediate part 22 extends continuously from a rear end side in the axial direction Da of the front end part 23. The intermediate part 22 is disposed in the communication hole 16 of the nozzle element 10. A gap G1 is formed between an outer peripheral surface 221 of the intermediate part 22 and an inner peripheral surface of the communication hole 16. From a rear end side in the axial direction Da of the intermediate part 22, the rear end part 21 extends continuously.

The rear end part 21 is disposed in the second internal space 140 of the nozzle element 10. The rear end part 21 is formed substantially into a columnar shape larger in outer diameter than the intermediate part 22. The rear end part 21 is inserted into a cylindrical hole of the fixed core 40, which will be described later. The rear end part 21 is provided with a rear end side sliding part 211, a plurality of channel forming parts 212, and an engaging part 213.

The rear end side sliding part 211 is formed on an outer peripheral surface of the rear end part 21. The rear end side sliding part 211 is supported slidably on an inner peripheral surface 41 of the fixed core 40, which will be described later. The valve element 20 is thus supported by the fixed core 40 in such a way as to be capable of moving along the axial direction Da.

The plurality of channel forming parts 212 are formed by cutting out the outer peripheral surface of the rear end part 21 at a plurality of spots along the axial direction Da. The channel forming parts 212 form a channel FC between the channel forming parts 212 and the inner peripheral surface 41 of the fixed core 40, which will be described later, the channel FC allowing the fuel to flow therethrough.

The engaging part 213 is located closer to the front end part side in the axial direction Da than the channel forming parts 212 formed on the rear end part 21. The engaging part 213 overhangs outward radially from the outer peripheral surface of the rear end part 21. The engaging part 213 engages with the movable core 30, which will be to described later, when the valve element 20 makes a valve opening/closing action.

One end part of the first spring 61 is in contact with an end face of the rear end part 21, the end face being on the rear end part side in the axial direction Da. The valve element 20 is urged toward the front end part (valve closing side) in the axial direction Da, by the first spring 61.

The valve element 20 having the above-described configuration is made of a metal material, such as SUS.

[Movable Core]

The movable core 30 will then be described. In the second internal space 140 of the nozzle element 10, the movable core 30 is disposed between the rear end part 21 of the valve element 20 and the bottom of the second internal space 140. A minute gap G3 is formed between an outer peripheral surface of the movable core 30 and an inner peripheral surface of the second inner space. This allows the movable core 30 to move along the axial direction Da in the second internal space 140.

The movable core 30 is formed into a cylindrical shape. The movable core 30 has an insertion hole 31 and an eccentric through-hole 32. The insertion hole 31 and the eccentric through-hole 32 are through-holes penetrating the movable core 30 from its one end part to the other end part in the axial direction Da. The insertion hole 31 is formed on an axis of the movable core 30. In the insertion hole 31, the intermediate part 22 of the valve element 20 is inserted.

The eccentric through-hole 32 is formed at a position eccentric to the axis of the movable core 30. The eccentric through-hole 32 communicates with the channel FC formed by the channel forming parts 212 and the inner peripheral surface 41 of the fixed core 40. The eccentric through-hole 32 forms the channel FC through which the fuel flows.

The other end part of the second spring 63 is in contact with an end face of the movable core 30, the end face being on a front end side in the axial direction Da of the movable core 30. The second spring 63 is thus interposed between the movable core 30 and the spring housing part 141 of the nozzle element 10. The fixed core 40 in in contact with an end face of the movable core 30, the end face being on a rear end side in the axial direction Da of the movable core 30.

[Fixed Core]

The fixed core 40 is a member that attracts the movable core 30 by a magnetic attraction force. The fixed core 40 is formed substantially into a cylindrical shape having irregularities on its outer peripheral surface. A front end part in the axial direction Da of the fixed core 40 is press-fitted in the large-diameter part 14 of the nozzle element 10, i.e., the second internal space 140. The nozzle element 10 and the fixed core 40 are welded to each other. This seals a gap between the nozzle element 10 and the fixed core 40, thus sealing an internal space of the nozzle element 10.

The front end part of the fixed core 40 is counter to the end face of the movable core 30 disposed in the second internal space 140, the end face being on the rear end side in the axial direction Da of the movable core 30. The front end part of the fixed core 40, the front end part being counter to the movable core 30, may be coated with plating, such as hard chromium plating or electroless nickel plating. This improves the durability and reliability of the front end part of the fixed core 40 with which the movable core 30 collides.

Likewise, the rear end part of the movable core 30, the rear end part being counter to the fixed core 40, may be coated with plating, such as hard chromium plating or electroless nickel plating. This ensures the durability and reliability of the movable core 30 even in a case where soft magnetic stainless steel, which is relatively soft, is used as the movable core 30.

A rear end part side in the axial direction Da of the fixed core 40 projects from the second internal space 140 of the nozzle element 10 toward a rear end in the axial direction Da.

A through-hole 42 is formed in the fixed core 40. The through-hole 42 is formed to be coaxial with the axis AX1. The through-hole 42 forms the channel FC through which fuel flows. On a rear end part in the axial direction Da of the fixed core 40, an opening 43 is formed, which communicates with the through-hole 42. The fuel is led through the opening 43 into the through-hole 42. A filter 90 is inserted from the opening 43 into the through-hole 42.

On a front end part side in the axial direction Da of the through-hole 42, the first spring 61 and the adjustment member 62 are disposed. The first spring 61 is disposed closer to the front end of the through-hole 42 than the adjustment member 62. The adjustment member 62 is press-fitted in the through-hole 42 and is fixed inside the fixed core 40. The rear end part 21 of the valve element 20 is inserted in the front end part of the through-hole 42. The first spring 61 is interposed between the adjustment member 62 and the rear end part 21 of the valve element 20. The first spring 61 urges the valve element 20 in the axial direction Da toward the front end part of the nozzle element 10.

By adjusting the fixed position of the adjustment member 62 relative to the fixed core 40, an urging force of the first spring 61 that is applied to the valve element 20 can be adjusted. As a result, an initial load (pressure) that the front end part 23 of the valve element 20 applies to a seat surface 124*a* formed on the injection hole forming member 12, which will be described later, of the nozzle element 10 can be adjusted.

The urging force with which the first spring 61 urges the valve element 20 toward the front end part of the nozzle element 10 is set larger than an urging force with which the second spring 63 urges the movable core 30 toward the fixed core 40.

[Coil]

The coil 50 will then be described. The coil 50 is wound around a coil bobbin 51 of a cylindrical shape. The coil 50 is wound around the coil bobbin 51 and is disposed in such a way as to cover a part of an outer peripheral surface of the large-diameter part 14 of the nozzle element 10 and a part of an outer peripheral surface of the front end part of the fixed core 40. A winding-start end and a winding-termination end of the coil 50 are connected to a power supply terminal 811 of a connector 81 of the connecting portion 80, which will be described later, via a cable (not illustrated). A housing 70 is fixed along outer peripheries of the coil 50 and the coil bobbin 51.

[Housing]

The housing 70 is formed into a cylindrical shape with a bottom. A through-hole 71 is formed on the bottom that is a front end part in the axial direction Da of the housing 70. The through-hole 71 is formed in the center of the bottom. Into the through-hole 71, the large-diameter part 14 of the nozzle element 10 is inserted. An opening edge of the through-hole 71 and the outer peripheral surface of the nozzle element 10 are welded to each other, for example, along the entire circumference. The nozzle element 10 is thus fixed to the housing 70.

The housing 70 is disposed in such a way as to encircle the front end part side of the fixed core 40 and the outer peripheries of the coil bobbin 51 and the coil 50. An inner peripheral surface of the housing 70 is counter to the large-diameter part 14 of the nozzle element 10 and to the coil 50, thus forming an outer peripheral yoke part. In this manner, a trodyle-shaped magnetic passage including the fixed core 40, the movable core 30, the nozzle element 10, and the housing 70 is formed around the coil 50.

[Connecting Portion]

The connecting portion 80 is made of resin. The connecting portion 80 fills a gap between the fixed core 40, coil 50, and coil bobbin 51 and the housing 70. In addition, on a side closer to the rear end in the axial direction Da than the housing 70, the connecting portion 80 covers the outer peripheral surface of a part of fixed core 40 that does not include the rear end part. The connecting portion 80 is molded in such a way as to form the connector 81 having the power supply terminal 811. The terminal 811 is connected to a connection terminal of a plug (not illustrated). Hence the fuel injection device 1 is connected to a high-voltage power supply or a battery power supply. Power supply to the coil 50 is controlled by an engine control unit (ECU) (not illustrated).

1-2. Example of Operation of Fuel Injection Device

An example of an operation of the fuel injection device 1 having the above-described configuration will then be described with reference to FIGS. 1 and 2.

Figure 2:
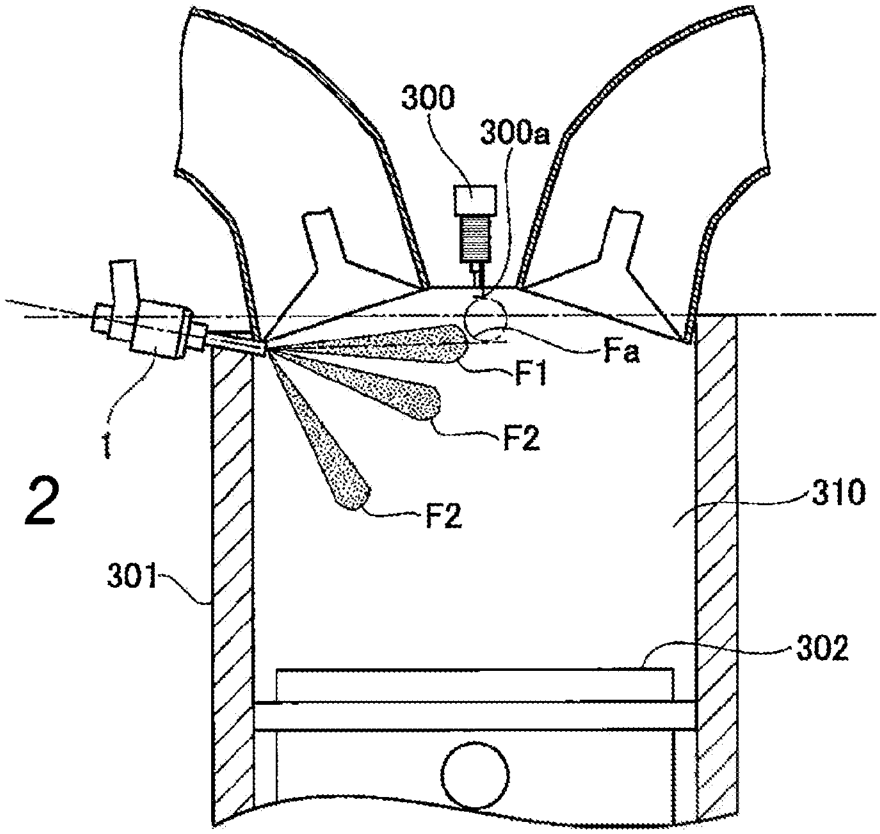
FIG. 2 is a schematic diagram showing a state in which the fuel injection device according to the embodiment is incorporated in an internal combustion engine.

FIG. 2 is a schematic diagram showing a state in which the fuel injection device 1 is incorporated in an internal combustion engine.

As shown in FIG. 2, the fuel injection device 1 is set on a wall surface of a cylinder 301 making up the internal combustion engine. The fuel injection device 1 is set such that the front end part of the nozzle element 10, the front end part being the part from which the fuel is jetted, is placed in a combustion chamber 310 formed by an inner wall surface of the cylinder 301 and a piston 302. The front end part of the nozzle element 10 of the fuel injection device 1 is positioned to face toward ignition plug 300.

As described above, the urging force of the first spring 61 is set larger than the urging force of the second spring 63. When the coil 50, which will be described later, is not supplied with power, therefore, the front end part 23 of the valve element 20 is pressed against the seat surface 124*a* of the injection hole forming member 12, which will be described later. As a result, the channel FC leading to the injection holes 18 and 19 is closed by the valve element 20 to create a valve-closed state.

Subsequently, when the coil 50 is supplied with power by the ECU, magnetic flux flows through a magnetic circuit including the fixed core 40, the movable core 30, the nozzle element 10, and the housing 70. As a result, a magnetic attraction force that attracts the movable core 30 is generated in the fixed core 40. When the magnetic attraction force of the fixed core 40 exceeds the urging force of the first spring 61, that is, a set load, the movable core 30 moves toward the fixed core 40. The movable core 30 continues to move until its end face counter to the fixed core 40, that is, the end face on the rear end side collides with the end face of the fixed core 40 on its front end side.

When the movable core 30 moves, the engaging part 213 formed on the rear end part 21 of the valve element 20 engages with the movable core 30. As a result, the valve element 20 moves together with the movable core 30, toward the fixed core 40, i.e., toward the rear end along the axial direction Da.

As a result of the valve element 20 moving toward the fixed core 40, the front end part 23 of the valve element 20 separates from the injection hole forming member 12. This opens the channel FC leading to the injection hole 18, the channel FC being formed between the valve element 20 and the injection hole forming member 12, thus creating a valve-opened state in which the injection holes 18 and 19 are opened.

When the valve element 20 is in a valve-opened position (valve-opened state), the fuel is supplied into the opening 43 of the fixed core 40 via the filter 90. The fuel then flows through the through-hole 42 of the fixed core 40 toward the nozzle element 10. The fuel passes through the adjustment member 62 and the first spring 61 disposed in the through-hole 42, and flows through the channel FC formed between the channel forming parts 212 of the valve element 20 and the inner peripheral surface 41 of the fixed core 40. The fuel further flows through the eccentric through-hole 32 of the movable core 30 into the second internal space 140 of the nozzle element 10.

The fuel having entered the second internal space 140 then flows through the gap G1 formed between the valve element 20 and the communication hole 16 of the nozzle element 10 and enters the first internal space 130 of the nozzle element 10. The fuel then flows through the channel FC formed between the front end part 23 of the valve element 20 and the injection hole forming member 12 and is injected into the combustion chamber 310 through the injection holes 18 and 19.

When power supply to the coil 50 is interrupted by the ECU, the magnetic flux flowing through the magnetic circuit including the fixed core 40, the movable core 30, the nozzle element 10, and the housing 70 disappears. At the same time, the magnetic attraction force of the fixed core 40 that attracts the movable core 30 disappears, too. This puts the fuel injection device 1 in its initial state in which the elastic force (urging force) of the first spring 61, the elastic force urging the valve element 20 toward the injection hole forming member 12 of the nozzle element 10, is larger than the elastic force of the second spring 63, the elastic force urging the movable core 30 toward the fixed core 40.

As a result, the valve element 20 is urged toward the injection hole forming member 12 of the nozzle element 10 by the first spring 61, thus moving toward the front end part along the axial direction Da. Meanwhile, the movable core 30 engaged with the engaging part 213 of the valve element 20 moves together with the valve element 20, toward the front end along the axial direction Da. As a result, the front end part 23 of the valve element 20 is pressed against the seat surface 124*a* of the injection hole forming member 12, which will be described later, and consequently the channel FC leading to the injection holes 18 and 19 is closed by the valve element 20 to create the valve-closed state. This results in suspension of fuel injection by the fuel injection device 1.

2. Detailed Configurations of Injection Holes, Injection Hole Forming Member, and Front End Part of Valve Element Detailed configurations of the injection holes 18 and 19, the injection hole forming member 12, and the front end part 23 of the valve element 20 will then be described with reference to FIGS. 1, 3, and 4.

Figure 3:
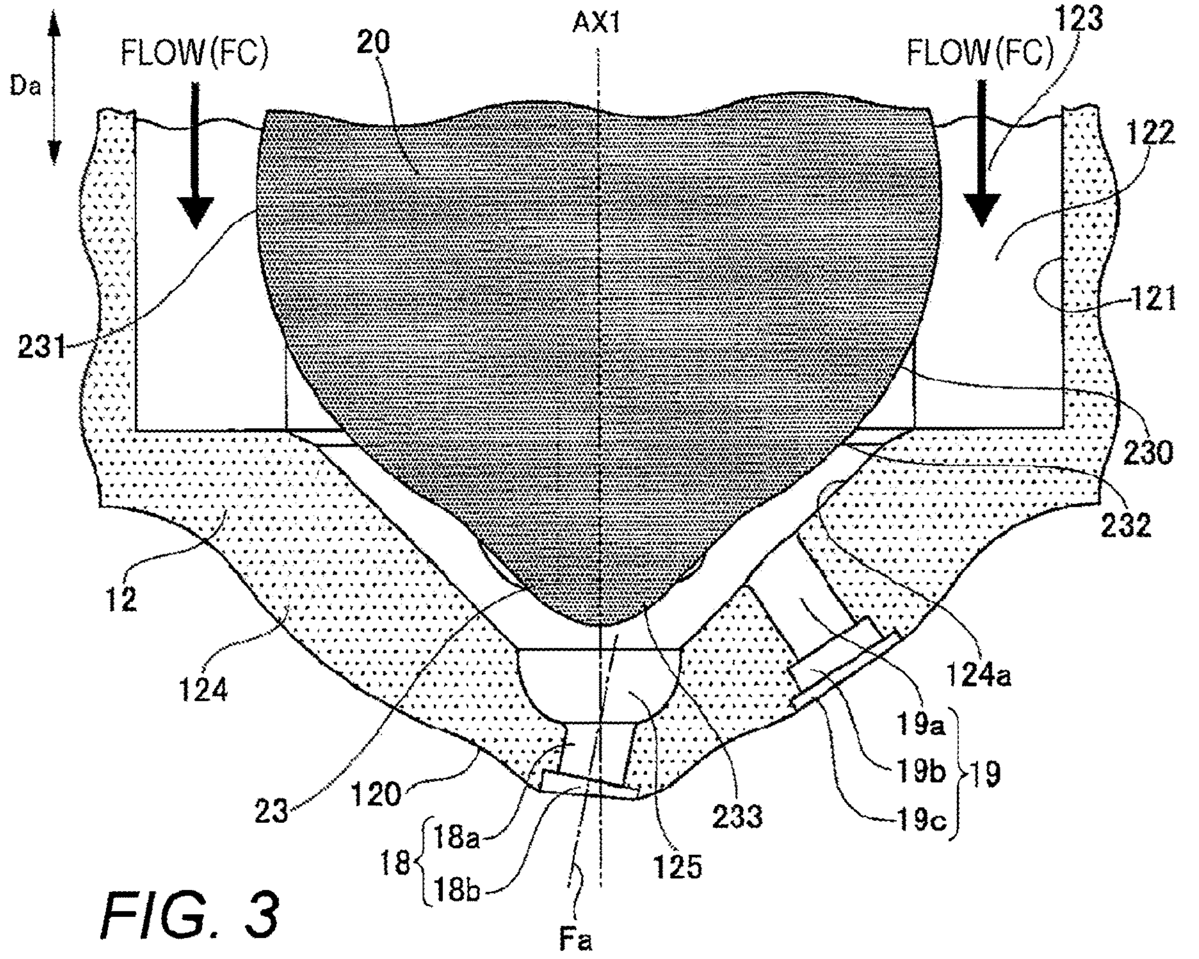
FIG. 3 is an enlarged sectional view of a front end part of the fuel injection device according to the embodiment.
Figure 4:
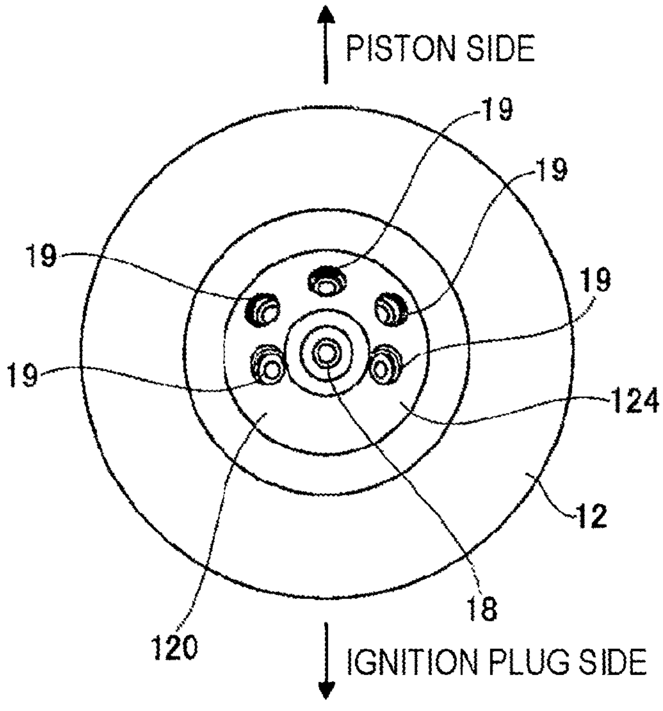
FIG. 4 is a front view of the front end part of the fuel injection device according to the embodiment.

FIG. 3 is an enlarged sectional view of the front end part of the fuel injection device 1, and FIG. 4 is a front view of the front end part of the fuel injection device 1.

As shown in FIGS. 1 and 3, the injection hole forming member 12 includes a cylindrical part 122 press-fitted in the first internal space 130 of the nozzle element 10 in such a way as to be tightly enclosed with an inner wall surface of the first internal space 130, and a seat part 124 extending continuously from a front end part side in the axial direction Da of the cylindrical part 122.

A front end side sliding part 231 formed on the front end part 23 of the valve element 20 slides over an inner peripheral surface 121 of the cylindrical part 122. The cylindrical part 122 has a plurality of cutouts 123. The plurality of cutouts 123 are formed at equal intervals on the inner peripheral surface 121 of the cylindrical part 122 in the circumferential direction of the inner peripheral surface 121. The channel FC, through which the fuel flows, is formed between the cutouts 123 and the front end side sliding part 231. The channel FC extends toward the seat part 124.

The seat part 124 is formed continuously on the cylindrical part 122 in such a way as to close an opening on the front end part side in the axial direction Da of the cylindrical part 122. The seat part 124 is a substantially hemispherical recess projecting toward the front end in the axial direction Da. Inside the seat part 124, the seat surface 124*a* is formed. A spherical surface part 230 of the valve element 20, which will be described later, comes into contact with and separates from this seat surface 124*a*. The seat surface 124*a* is formed into a truncated cone shape that reduces in diameter as it approaches the front end side in the axial direction Da.

A suck chamber 125 is formed on a front end part in the axial direction Da of the seat part 124. The suck chamber 125 is a recess that is formed on a front end part in the axial direction Da of the seat surface 124*a* and that dents in the direction of heading from the seat surface 124*a* toward the front end part in the axial direction Da to form a substantially hemispherical shape. The suck chamber 125 is formed on the axis AX1 of the fuel injection device 1. At least a part of a convex part 233 of the spherical surface part 230 of the valve element 20, which will be described later, is inserted into this suck chamber 125.

The front end part 23 of the valve element 20 includes the spherical surface part 230 and the front end side sliding part 231. The front end side sliding part 231 slides over the inner peripheral surface 121 of the cylindrical part 122 of the injection hole forming member 12. At a position closer to the front end part side in the axial direction Da than the front end side sliding part 231, the spherical surface part 230 is formed to extend continuously from the front end side sliding part 231.

The spherical surface part 230 is of a substantially hemispherical shape. The spherical surface part 230 has a valve element side seat surface 232 and the convex part 233. The valve element side seat surface 232 is counter to the seat surface 124*a* of the seat part 124, and moves closer to and separates away from the seat surface 124*a*. When the valve element side seat surface 232 comes in contact with the seat surface 124*a*, the channel FC leading to the injection holes 18 and 19, which will be described later, is closed. When the valve element side seat surface 232 separates from the seat surface 124*a*, the channel FC, through which the fuel flows, is formed between the valve element side seat surface 232 and the seat surface 124*a*, and the fuel is jetted from injection holes 18 and 19, which will be described later. When the valve element side seat surface 232 and the seat surface 124*a* come in contact with each other, a part of the convex part 233 is inserted into the suck chamber 125.

The suck chamber injection hole 18 is formed in the suck chamber 125, and a plurality of the seat part injection holes 19 (five seat part injection holes 19 in this embodiment) are formed on the seat surface 124*a*.

The suck chamber injection hole 18 is formed into a two-tier shape composed of an orifice hole 18*a* for spray formation and a counterbore hole 18*b* for plane formation. The orifice hole 18*a* extends from an inner wall surface of the suck chamber 125 toward the outer peripheral surface 120.

As shown in FIGS. 2 and 3, an axial direction Fa of the orifice hole 18*a* (which will hereinafter be referred to as an "injection axis"), the axial direction Fa being the direction of jetting the fuel in the suck chamber injection hole 18, faces toward the ignition plug 300. More specifically, the injection axis Fa of the suck chamber injection hole 18 is set facing toward an ignition area 300*a* where a spark is generated by the ignition plug 300. A spray F1 (which will hereinafter be referred to as "suck chamber spray") jetted from the suck chamber injection hole 18, therefore, heads for the ignition area 300*a*.

The counterbore hole 18*b* is a recess denting in the direction of heading from the outer peripheral surface 120 toward the orifice hole 18*a*, and is formed in such a way as to encircle the periphery of the orifice hole 18*a*. The opening diameter of the counterbore hole 18*b* is set larger than the opening diameter of the orifice hole 18*a*. A length from the outer peripheral surface 120 to the orifice hole 18*a* in the counterbore hole 18*b* is set shorter than a length from an inner wall surface of the suck chamber 125 to the counterbore hole 18*b* in the orifice hole 18*a*.

Each seat part injection hole 19 is formed into a three-tier shape composed of an orifice hole 19*a* for spray formation, a counterbore hole 19*b*, and a surface pressing hole 19*c* for plane formation. The orifice hole 19*a* extends from the seat surface 124*a* toward the outer peripheral surface 120. The counterbore hole 19*b* is formed in such a way as to encircle the orifice hole 19*a*, and extends from an end of orifice hole 19*a* that is closer to the outer peripheral surface 120 toward the outer peripheral surface 120. The surface pressing hole 19*c* is a recess denting in the direction of heading from the outer peripheral surface 120 toward the counterbore hole 19*b*, and is formed in such a way so to encircle the periphery of the counterbore hole 19*b*.

The seat part injection hole 19 is formed on a curved surface part of the injection hole forming member 12. For this reason, the seat part injection hole 19 is provided with the counterbore hole 19*b* for adjusting the length of the orifice hole 19*a*. The suck chamber injection hole 18, on the other hand, is formed on the front end part of the injection hole forming member 12. By adjusting the thickness of the seat part 124 at the suck chamber 125, therefore, the length of the orifice hole 18*a* in the suck chamber injection hole 18 can be easily adjusted.

This makes it unnecessary to provide the suck chamber injection hole 18 with a hole for adjusting the length of the orifice hole 18*a*. As a result, a processing time for forming the suck chamber injection hole 18 can be reduced.

In addition, because the counterbore hole 18*b* is needed only for plane formation, the length of the counterbore hole 18*b* can be minimized. This prevents a case where the spray F1 jetted from the suck chamber injection hole 18 deposits on a wall surface of the counterbore hole 18*b*.

In this embodiment, an example in which the suck chamber injection hole 18 is of the two-tier shape and the seat part injection hole 19 is of the three-tier shape has been described. The number of tiers of the suck chamber injection hole 18 and that of the seat part injection hole 19 are, however, not limited to two and three. For example, the suck chamber injection hole 18 may have three or more tiers of holes, the seat part injection hole 19 may have four or more tiers of holes, or the suck chamber injection hole 18 and the seat part injection hole 19 may each have a single tier of a hole, that is, have the orifice hole 18*a* and the orifice hole 19*a* only, respectively. It is preferable that to reduce the processing time for forming the suck chamber injection hole 18, the number of tiers of the suck chamber injection hole 18 be set smaller than the number of tiers of the seat part injection hole 19.

As shown in FIG. 4, the plurality of seat part injection holes 19 are formed at substantially equal intervals on an area surrounding the suck chamber injection hole 18, except that no seat part injection hole 19 is formed on a part of the suck chamber injection hole 18. Specifically, the plurality of seat part injection holes 19 are not formed at positions that are closer to the ignition plug 300 than the suck chamber injection hole 18 in the injection hole forming member 12. In other words, the suck chamber injection hole 18 is disposed closer to the ignition plug 300 than the plurality of seat part injection holes 19.

Figure 5:
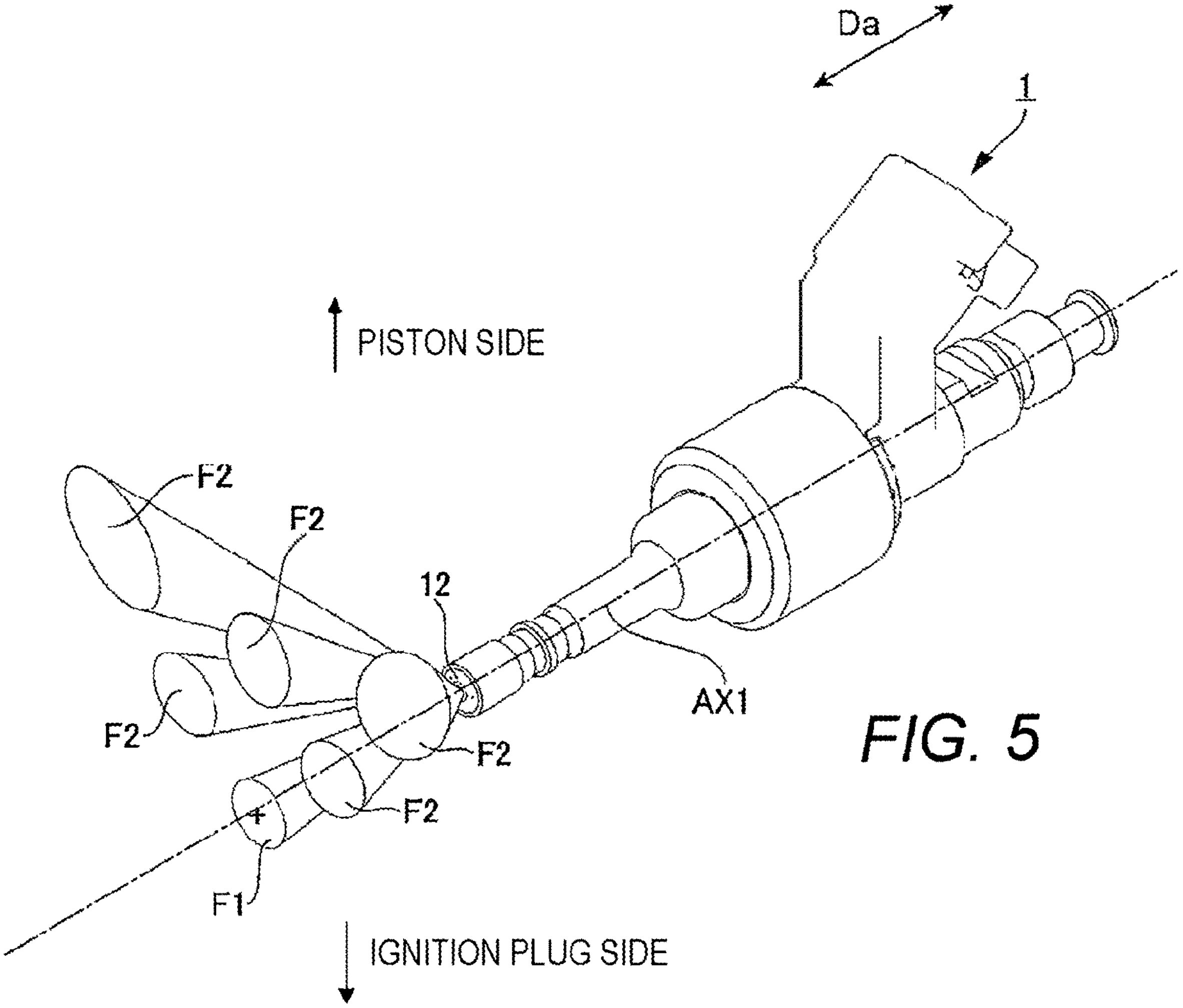
FIG. 5 is an external perspective view of sprays jetted out of the fuel injection device according to the embodiment.

FIG. 5 is an external perspective view of sprays jetted out of the fuel injection device 1.

As described above, the injection axis Fa of the suck chamber injection hole 18 faces toward the ignition plug 300, and the suck chamber injection hole 18 is disposed closer to the ignition plug 300 than the plurality of seat part injection holes 19. Because of this arrangement, as shown in FIGS. 2 and 5, the suck chamber spray F1 is the closest to the ignition plug 300, that is, closer to the ignition plug 300 than sprays F2 (which will hereinafter be referred to as "seat part spray") jetted from the plurality of seat part injection holes 19.

The plurality of seat part injection holes 19 are arranged in such a way as to avoid surrounding the entire periphery of the suck chamber injection hole 18. This prevents socalled spray shrinkage, which is a phenomenon that the suck chamber spray F1 and the plurality of seat part sprays F2 interfere with each other. This prevents a case where as a result of the sprays F1 and F2 interfering with each other, a spray length (penetration) increases, the spray length being defined as a length from the outer peripheral surface 120 of the injection hole forming member 12 to a point reached by droplets of the sprays, It should be noted that if angles between the injection axis Fa of the suck chamber injection hole 18 and the injection axes of the plurality of seat part injection holes 19 can be increased, the plurality of seat part injection holes 19 may be arranged in such a way as to surround the entire periphery of the suck chamber injection hole 18. In other words, the seat part injection holes 19 may be disposed closer to the ignition plug than the suck chamber injection hole 18.

However, in a phenomenon that follows the Bernoulli's theorem, the plurality of seat part sprays F2 might be attracted to the suck chamber spray F1. To avoid such a case, it is preferable that, as in the fuel injection device 1 of this embodiment, the seat part injection holes 19 be not arranged on a part of the area surrounding the suck chamber injection hole 18 so that the plurality of seat part injection holes 19 do not surround the entire periphery of the suck chamber injection hole 18.

Figure 6:
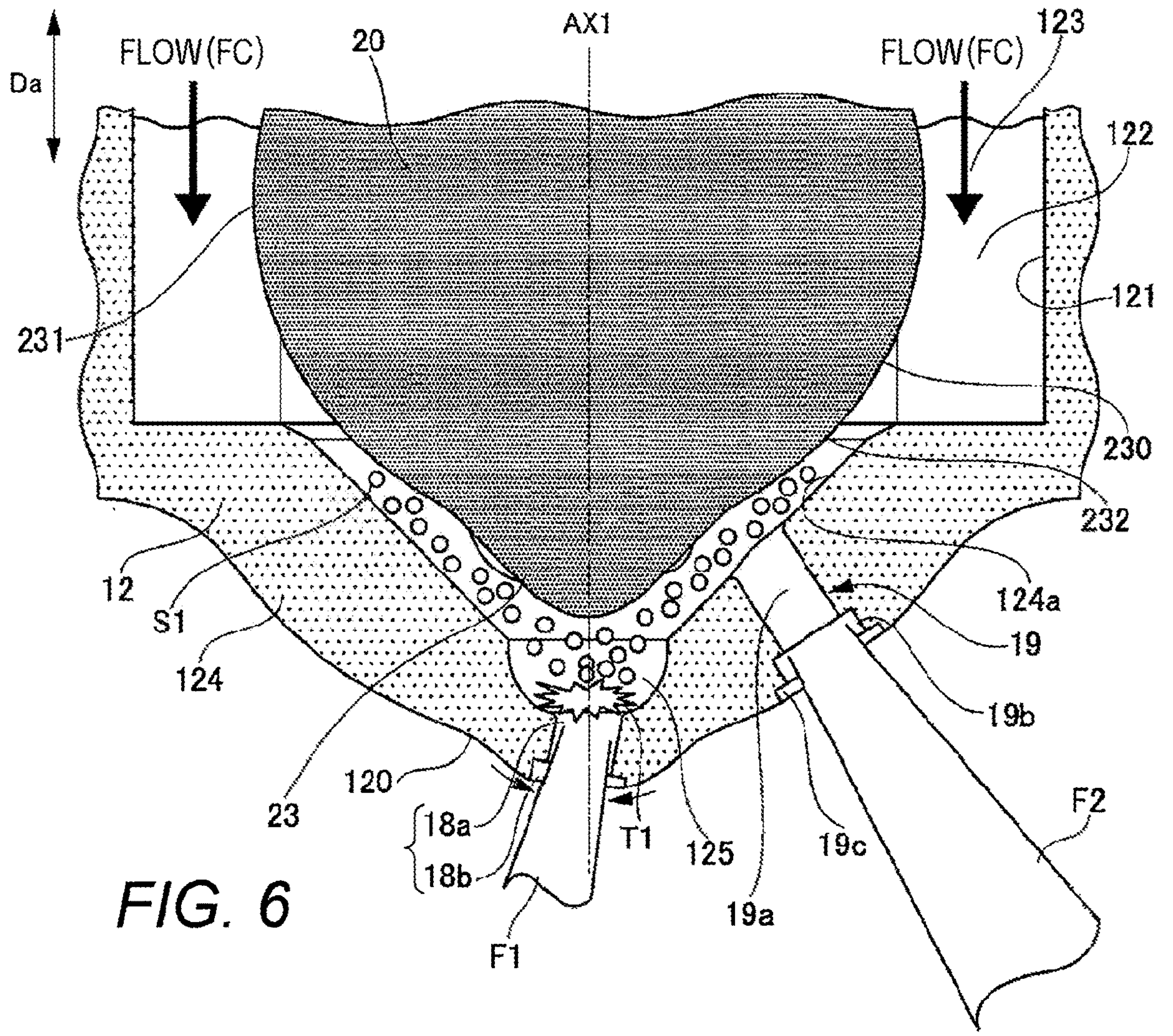
FIG. 6 is an enlarged explanatory diagram showing a state in which the fuel is jetted out of a suck chamber injection hole and a seat part injection hole of the fuel injection device according to the embodiment.

FIG. 6 is an enlarged explanatory diagram showing a state in which the fuel is jetted out of the suck chamber injection hole 18 and the seat part injection hole 19.

The fuel being jetted or having been jetted gathers round the axis AX1 on the outer peripheral surface 120 of the injection hole forming member 12. A spot on the axis AX1 on the outer peripheral surface 120 of the injection hole forming member 12 is, therefore, a spot where the fuel deposits most easily. In the fuel injection device 1 of this embodiment, however, the suck chamber injection hole 18 is formed to lie on the axis AX1 of the injection hole forming member 12.

When the fuel is jetted from the suck chamber injection hole 18, the pressure of a gas near the suck chamber spray F1 drops according to the Bernoulli's theorem. This creates a force that acts on the fuel deposited on the outer peripheral surface 120 in the direction of attracting the fuel to the suck chamber spray F1. As a result, the fuel deposited the outer peripheral surface 120 is attracted to the suck chamber spray F1 and is removed from the outer peripheral surface 120 as being carried by the suck chamber spray F1. In this manner, deposition of the fuel on the front end part of the injection hole forming member 12 is suppressed to improve combustion stability.

In addition, the suck chamber injection hole 18 is of the two-tier shape composed of the orifice hole 18*a* and the counterbore hole 18*b*, and the opening diameter of the counterbore hole 18*b* is made larger than the opening diameter of the orifice hole 18*a*. The counterbore hole 18*b* is made shorter in length than the orifice hole 18*a*. This increases the force with which the suck chamber spray F1 attracts the fuel deposited on the outer peripheral surface 120, according to the above-mentioned Bernoulli's theorem, thus allowing the fuel to be removed more efficiently from the outer peripheral surface 120.

When the fuel flows through the channel FC, bubbles S1, which are called cavitation, develop in the fuel. The bubbles S1 develop when the flow velocity increases as the channel FC gets narrower and, consequently, an internal pressure of the channel drops to a point equal to or lower than the saturated vapor pressure of the fuel. The channel FC between the valve element side seat surface 232 and the seat surface 124*a* is the narrowest channel in the fuel injection device 1. The bubbles S1, therefore, develop in an area extending from the vicinity of the seat part 124 of the injection hole forming member 12 to the channel FC between the valve element side seat surface 232 and the seat surface 124*a*, the channel FC being on the front end part side.

The bubbles S1 flow together with the fuel through the channel FC to reach the suck chamber 125 on the axis AX1 of the fuel injection device 1. The bubbles S1 then collapse in the suck chamber 125. Collapse energy T1 generated by collapse of the bubbles S1 can promote atomization of the fuel in the suck chamber 125. As a result, the fuel in a further atomized state can be jetted from the suck chamber injection hole 18 formed in the suck chamber 125.

Figure 7:
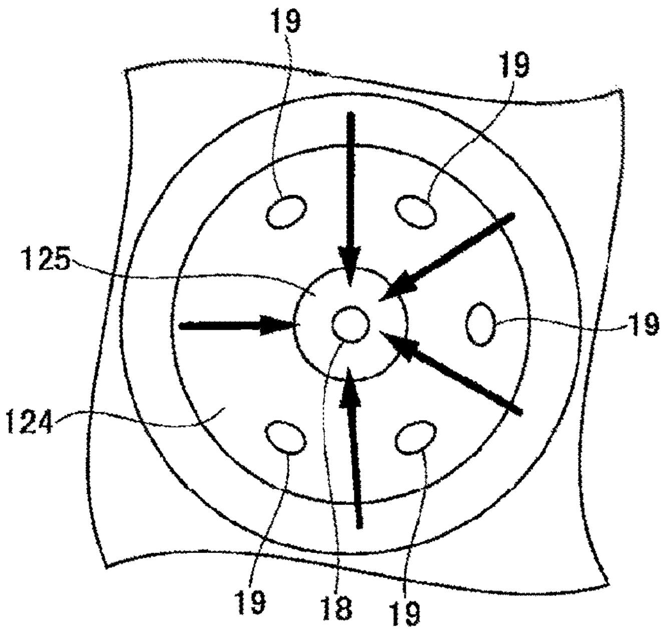
FIG. 7 is a plan view of the interior of a seat part of an injection hole forming member included in the fuel injection device according to the embodiment.

FIG. 7 is a plan view of the interior of the seat part 124 of the injection hole forming member 12.

As shown in FIG. 7, the suck chamber injection hole 18 is formed in the suck chamber 125 located at the center of the seat part 124. The fuel, therefore, flows into the suck chamber injection hole 18 from all sides ranging from 0° to 360° on the seat part 124. This reduces an amount of the fuel flowing into the seat part injection holes 19, thus suppress excess inflow of the fuel to the seat part injection holes 19. This prevents an increase in the spray length of the seat part spray F2 jetted from the seat part injection hole 19. As a result, a case where the seat part spray F2 reaches the wall surface of the cylinder 301 to leave the fuel deposited on the wall surface of the cylinder 301 or on the piston 302 can be prevented.

At the suck chamber injection hole 18, into which the fuel flows from all sides ranging from 0° to 360° on the seat part 124, the spray length of the suck chamber spray F1 is longer than that of the seat part spray F2 in the initial stage of spraying. In addition, as described above, the injection axis Fa of the suck chamber injection hole 18 is set facing toward the ignition area 300*a* of the ignition plug 300. Because of this arrangement, even if the spray length of the seat part spray F2 gets shorter, combustion stability in fast idling can be maintained or improved.

The seat part injection hole 19 is not disposed closer to the ignition plug 300 than the suck chamber injection hole 18. This prevents a case where the seat part spray F2 reaches a cylinder head, an intake valve, an exhaust valve, and the like of the internal combustion engine and leaves the fuel deposited on the cylinder head, the intake valve, and the exhaust valve.

It should be noted that the present invention is not limited to the embodiment described above and illustrated in the drawings, and that the invention may be modified into various forms within a range that does not deviate from the substance of the invention described in the claims.

In the description made herein, such terms as "parallel" and "perpendicular" are used. These terms do not limitedly refer to exact "parallel" and "perpendicular" only but may also refer to states of "substantially parallel" and "substantially perpendicular" that include "parallel" and "perpendicular" and that define a conceptual range in which intended functions can be exerted.

REFERENCE SIGNS LIST

1 fuel injection device
10 nozzle element
12 injection hole forming member
18 suck chamber injection hole (injection hole)
18*a*, 19*a* orifice hole

18*b*, 19*b* counterbore hole
19 seat part injection hole
19*c* surface pressing hole
20 valve element
23 front end part
30 movable core
40 fixed core
50 coil
70 housing
80 connecting portion
120 outer peripheral surface
121 inner peripheral surface
122 cylindrical part
123 cutout
124 seat part
124*a* seat surface
125 suck chamber
230 spherical surface part
231 front end side sliding part
232 valve element side seat surface
233 convex part
300 ignition plug
300*a* ignition area
301 cylinder
302 piston
310 combustion chamber
AX1 axis
Da axial direction
F1 suck chamber spray
F2 seat part spray
S1 bubbles
T1 collapse energy

The invention claimed is:

1. A fuel injection device comprising:

a nozzle element set on a cylinder of an internal combustion engine, the cylinder having an ignition plug disposed thereon;

an injection hole forming member disposed on a front end part of the nozzle element; and a valve element having a valve element side seat surface that comes into contact with and separates from a seat surface formed on the injection hole forming member, wherein the injection hole forming member includes:

a seat part having the seat surface; and a suck chamber formed on a front end part of the seat part, the suck chamber being a recess denting in a direction of heading from the seat surface toward the front end part of the seat part, and wherein the suck chamber has a suck chamber injection hole from which a fuel is jetted toward the ignition plug, the suck chamber injection hole formed on an axis of the injection hole forming member, a seat part injection hole for injecting the fuel is formed on the seat surface, a plurality of the seat part injection holes are formed on the seat surface, and the plurality of seat part injection holes are not arranged at least on a part of an area surrounding the suck chamber injection hole, the plurality of seat member injection holes are not formed closer to the ignition plug than the suck chamber injection hole member in the injection hole forming member, and the suck chamber injection hole is disposed closer to the ignition plug than the seat part injection hole in the injection hole forming member.

2. The fuel injection device according to claim 1, wherein an injection axis that is a direction of jetting the fuel in the suck chamber injection hole faces toward an ignition area where a spark is generated by the ignition plug.

3. The fuel injection device according to claim 1, wherein the suck chamber is formed at a center of the seat part.

4. The fuel injection device according to claim 1, wherein the suck chamber injection hole includes:

an orifice hole extending from an inner wall surface of the suck chamber toward an outer peripheral surface of the injection hole forming member; and a counterbore hole that is a recess denting in a direction of heading from the outer peripheral surface toward the orifice hole.

5. The fuel injection device according to claim 4, wherein an opening diameter of the counterbore hole is set larger than an opening diameter of the orifice hole.

6. The fuel injection device according to claim 4, wherein a length from the outer peripheral surface to the orifice hole in the counterbore hole is set shorter than a length from an inner wall surface of the suck chamber to the counterbore hole in the orifice hole.

7. The fuel injection device according to claim 1, wherein each of the suck chamber injection hole and the seat part injection hole is formed into a multi-tier shape, and wherein a number of tiers of the suck chamber injection hole is set smaller than a number of tiers of the seat part injection hole.

* * * * *